United States Patent
Ueta et al.

(10) Patent No.: US 8,067,867 B2
(45) Date of Patent: Nov. 29, 2011

(54) MOTOR WITH NEUTRAL BUS RING CONNECTING MULTIPLE MOTOR COILS

(75) Inventors: Tetsuji Ueta, Hirakata (JP); Hiroaki Sagara, Kasai (JP); Yukifumi Yamaguchi, Himeji (JP); Takashi Uchino, Hirakata (JP); Kenji Taguchi, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 139 days.

(21) Appl. No.: 12/401,675

(22) Filed: Mar. 11, 2009

(65) Prior Publication Data

US 2009/0243418 A1    Oct. 1, 2009

(30) Foreign Application Priority Data

Mar. 28, 2008 (JP) .................. 2008-088254

(51) Int. Cl.
*H02K 11/00* (2006.01)
(52) U.S. Cl. ........ 310/71; 310/194; 310/254.1; 310/179
(58) Field of Classification Search .................... 310/71, 310/194, 179–184, 254.1
See application file for complete search history.

(56) References Cited

U.S. PATENT DOCUMENTS

| | | | | |
|---|---|---|---|---|
| 2,894,157 A * | 7/1959 | Morrill | | 310/179 |
| 5,293,091 A * | 3/1994 | Edwards et al. | | 310/71 |
| 5,682,070 A * | 10/1997 | Adachi et al. | | 310/71 |
| 6,382,194 B2 * | 5/2002 | Maeda | | 123/568.16 |
| 6,600,244 B2 * | 7/2003 | Okazaki et al. | | 310/71 |
| 6,707,216 B2 * | 3/2004 | Han et al. | | 310/211 |
| 7,268,459 B2 * | 9/2007 | Baba et al. | | 310/216.067 |
| 2001/0047799 A1 * | 12/2001 | Maeda | | 123/568.16 |
| 2004/0150276 A1 * | 8/2004 | Yokoyama et al. | | 310/71 |
| 2004/0150280 A1 * | 8/2004 | Moroto et al. | | 310/154.28 |
| 2004/0183388 A1 * | 9/2004 | Rittmeyer | | 310/179 |
| 2004/0245882 A1 * | 12/2004 | Horie et al. | | 310/194 |
| 2005/0189828 A1 * | 9/2005 | Nakayama et al. | | 310/71 |
| 2006/0033395 A1 * | 2/2006 | Izumi et al. | | 310/208 |
| 2006/0043806 A1 * | 3/2006 | Torii et al. | | 310/71 |
| 2006/0103247 A1 * | 5/2006 | Kotajima | | 310/71 |
| 2006/0119207 A1 * | 6/2006 | Okada et al. | | 310/194 |
| 2006/0132145 A1 * | 6/2006 | Enomoto | | 324/607 |
| 2007/0001526 A1 * | 1/2007 | Okada et al. | | 310/71 |
| 2007/0057591 A1 * | 3/2007 | Takahashi et al. | | 310/180 |
| 2007/0080592 A1 * | 4/2007 | Ohta et al. | | 310/71 |
| 2008/0018193 A1 * | 1/2008 | Kobayashi | | 310/219 |
| 2008/0122301 A1 * | 5/2008 | Okada et al. | | 310/43 |
| 2008/0265701 A1 * | 10/2008 | Ueda et al. | | 310/71 |
| 2009/0039720 A1 * | 2/2009 | Tsukashima et al. | | 310/71 |

FOREIGN PATENT DOCUMENTS

JP         2007-068369 A         3/2007

* cited by examiner

*Primary Examiner* — Quyen Leung
*Assistant Examiner* — Alex W Mok
(74) *Attorney, Agent, or Firm* — Marvin A. Motsenbocker; Mots Law, PLLC

(57) ABSTRACT

A stator includes multiple motor coils. The motor coils include multiple U-phase coils, multiple V-phase coils and multiple W-phase coils which are arranged in a circumferential direction of a motor. A neutral bus ring connects the motor coils together. The neutral bus ring is divided into multiple bus ring members. Each bus ring member connects together any one of the U-phase coils, any one of the V-phase coils and any one of the W-phase coils.

12 Claims, 11 Drawing Sheets

MOTOR WITH NEUTRAL BUS RING CONNECTING MULTIPLE MOTOR COILS

CROSS REFERENCE TO RELATED APPLICATIONS

This application claims priority based on 35 USC 119 from prior Japanese Patent Application No. P2008-088254 filed on Mar. 28, 2008, entitled "Motor", the entire contents of which are incorporated herein by reference.

1. FIELD OF THE INVENTION

The invention relates to a motor including a neutral bus ring configured to connect multiple motor coils together.

2. DESCRIPTION OF RELATED ART

Widely used is a motor with a stator including multiple motor coils and a ring-shaped neutral bus ring configured to connect these motor coils together. The motor coils include multiple U-phase coils, multiple V-phase coils and multiple W-phase coils which are arranged in the circumferential direction of the motor.

In such a motor, the neutral bus ring is generally formed as a single component punched out from a metal sheet. This practice can cause problems in that a large metal sheet is required, and connection to the neutral bus ring to the motor coils can be unreliable.

Alternatively, Japanese Patent Application Publication No. 2007-68369 discloses a neutral-point connecting structure in which, instead of using the neutral bus ring, a neutral-point connecting terminal is provided to each of the motor coils, and in which adjacent motor coils are connected together through the neutral-point connecting terminal.

However, the neutral-point connecting structure disclosed in Japanese Patent Application Publication No. 2007-68369 has a problem of increasing the number of parts because it requires neutral-point connecting terminals corresponding to each motor coil. This problem may be particularly serious for a motor including a large number of motor coils.

Furthermore, detection of change in electrical characteristics such as current, voltage, resistance or inductance) of the motor is effective for detecting a wire breakage in the motor coils. In the existing neutral-point connecting structures described above, however, all the motor coils included in the motor are connected to a single neutral point. For this reason, even when a wire breaks in one of the motor coils, the amount of change in the electrical characteristics of the motor is so small that it is difficult to detect the wire breakage.

SUMMARY OF THE INVENTION

An aspect of the invention provides a motor that comprises: a stator including multiple motor coils, the motor coils comprising multiple U-phase coils, multiple V-phase coils and multiple W-phase coils which are arranged in a circumferential direction of the motor; and a neutral bus ring configured to connect the motor coils together, wherein the neutral bus ring is divided into multiple bus ring members, and each bus ring member connects together any one of the U-phase coils, any one of the V-phase coils and any one of the W-phase coils.

According to the above-described motor, the neutral bus ring is divided into the multiple bus ring members, and each bus ring member connects one U-phase coil, one V-phase coil and one W-phase coil together. For this reason, the neutral-point connecting structure in the motor requires fewer parts than does the structure in which each motor coil is provided with a member configured to connect the motor coil and a corresponding neutral point together.

In addition, in the motor of embodiments, each bus ring member connects together one U-phase coil, one V-phase coil and one W-phase coil. Accordingly, the amount of change in electrical characteristics due to a wire breakage in one coil is large enough to enhance defection.

Another aspect of the invention provides a motor that comprises: a motor coil comprising: a first U-phase coil and a second U-phase coil; a first V-phase coil and a second V-phase coil; and a first W-phase coil and a second W-phase coil, wherein a U-phase current is supplied to an end of the first U-phase coil and to an end of the second U-phase coil, a V-phase current is supplied to an end of the first V-phase coil and to an end of the second V-phase coil, a W-phase current is supplied to an end of the first W-phase coil and to an end of the second W-phase coil, the other end of the first U-phase coil, the other end of the first V-phase coil, and the other end of the first W-phase coil are connected to a first neutral point, the other end of the second U-phase coil, the other end of the second V-phase coil, and the other end of the second W-phase coil are connected to a second neutral point, and the first neutral point and the second neutral point are electrically insulated from each other.

BRIEF DESCRIPTION OF THE DRAWING

FIG. 8A is an equivalent circuit diagram of an existing three-phase brushless motor. FIG. 8B is an equivalent circuit diagram of the three-phase brushless motor according to the embodiment.

DETAILED DESCRIPTION OF EMBODIMENTS

Figure 1:
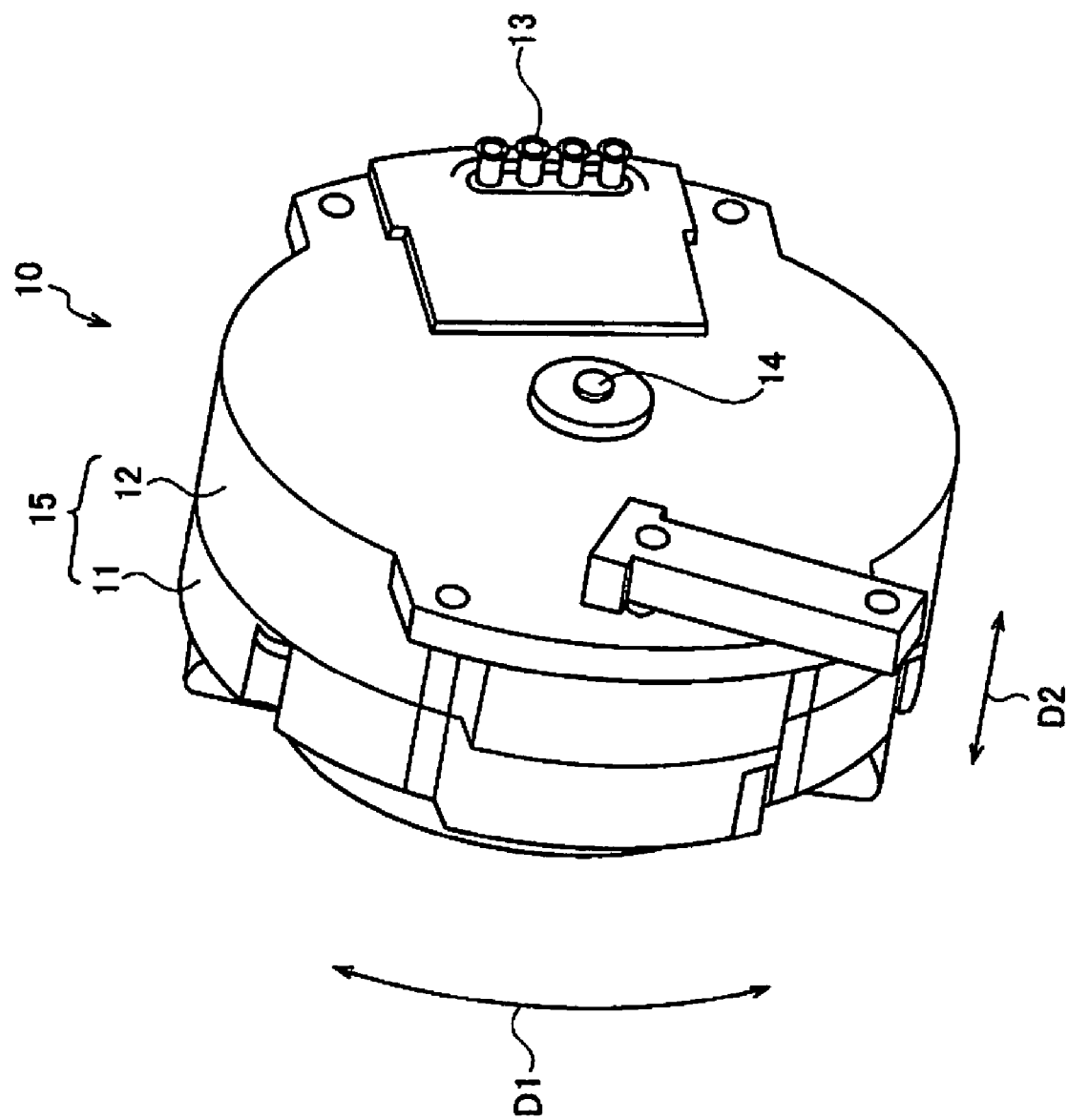
FIG. 1 is an external view of a motor according to an embodiment of the invention.

Hereinafter, descriptions are provided for a motor according to embodiments of the invention by referring to the drawings. Specifically, descriptions are provided for (1) an overall schematic configuration of the motor, (2) configurations respectively of a stator and a neutral bus ring, (3) detailed configurations respectively of the neutral bus ring and an insulator, (4) a wire breakage detecting method, (5) method of how teeth and a yoke are assembled together, (6) operation and effects, and (7) other embodiments.

In the respective drawings referenced herein, the same constituents are designated by the same reference numerals and duplicate explanation concerning the same constituents is basically omitted. All of the drawings are provided to illustrate the respective examples only. No dimensional proportions in the drawings shall impose a restriction on the embodiments. For this reason, specific dimensions and the like should be interpreted with the following descriptions taken into consideration. In addition, the drawings include parts whose dimensional relationship and ratios are different from one drawing to another.

(1) Overall Schematic Configuration of Motor

FIG. 1 is an external view of three-phase brushless motor 10 according to the embodiment. Three-phase brushless motor 10 is a three-phase inner rotor brushless motor arranged in a vicinity of a wheel of a motor vehicle. This type of three-phase brushless motor 10 is required to be capable of generating a driving force for driving a wheel, and concurrently to be compact in size.

As shown in FIG. 1, three-phase brushless motor 10 includes: case 15; shaft 14 inserted in case 15; and terminal part 13 to be attached to case 15.

Case 15 is shaped almost like a cylinder. Case 15 includes case main body 12 and lid body 11. Lid body 11 is fastened to case main body 12 by use of bolts (not shown). U-phase, V-phase and W-phase currents, voltages and the like whose phases are spaced equally, giving a phase separation of 120 degree, are inputted into terminal part 13.

Figure 2:
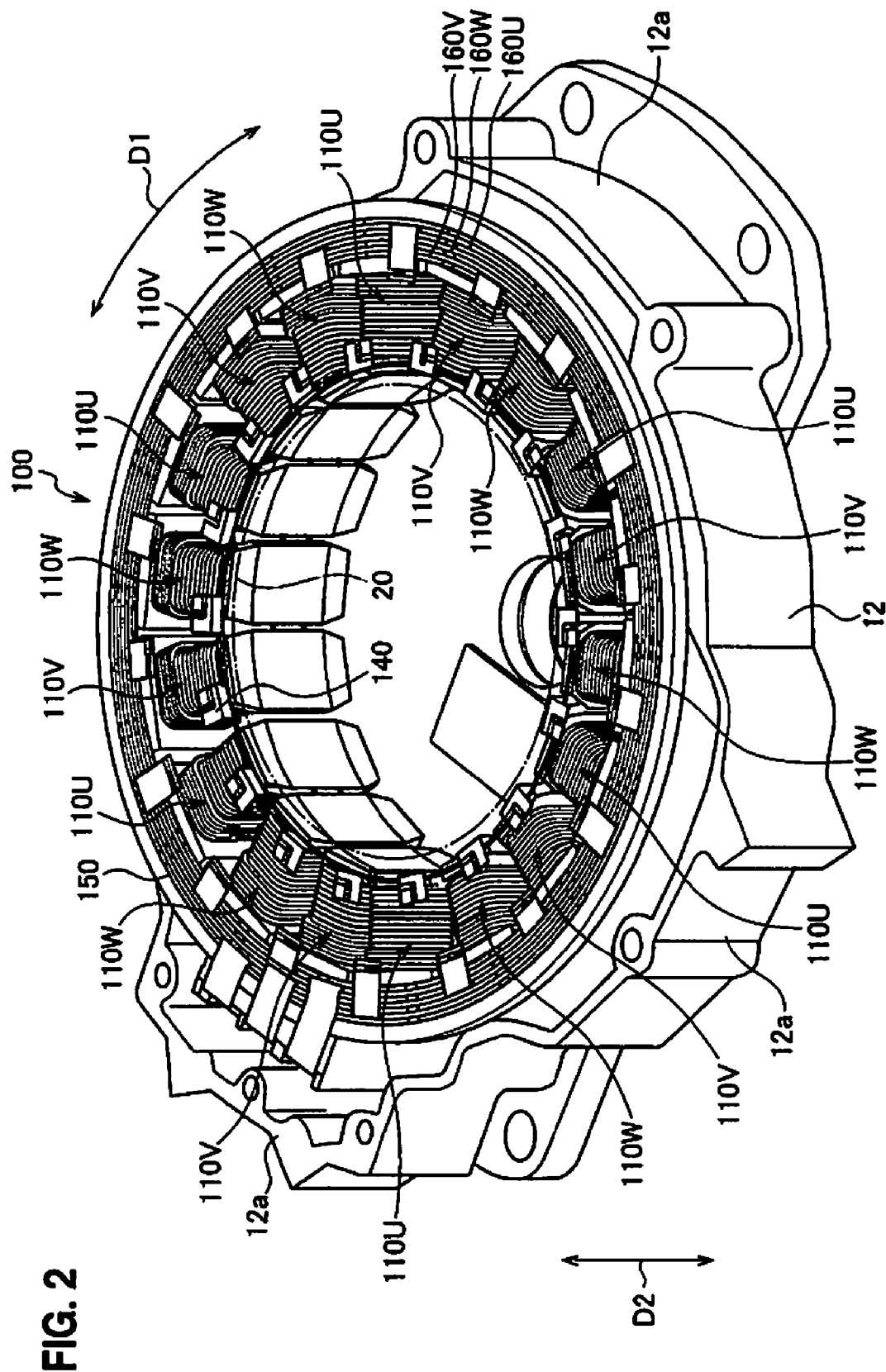
FIG. 2 is a perspective view showing an internal configuration of a case main body according to the embodiment.

FIG. 2 is a perspective view showing an internal configuration of case main body 12. As shown in FIG. 2, rotor 20 and stator 100 are arranged in case 12 main body 12. Case main body 12 includes four protruded parts 12a which protrude outward in the radial direction. Each protruded part 12a includes a fastening mechanism configured to fasten stator 100 and the like to case main body 12.

Stator 100 is arranged in the circumferential direction D1 so as to encompass the outer perimeter of rotor 20 in the radial direction. Stator 100 includes multiple motor coils 110U, multiple motor coils 110V and multiple motor coils 110W.

Six motor coils 110U are each provided for the U phase. In addition, six motor coils 110V are each provided for the V phase, and six motor coils 110W are each provided for the W phase.

In this embodiment, a total of 18 motor coils 110U, 110V, 110W are arranged in the circumferential direction D1 in this manner. Specifically, six sets each consisting of one motor coil 110U, one motor coil 110V and one motor coil 110W are formed.

Neutral bus ring 140 is arranged in radial inner end portions respectively of motor coils 110U, 110V, 110W. Neutral bus ring 140 is shaped like a ring, and is formed from a metal sheet.

Ring-shaped bus ring holder 150 is arranged in radial outer end portions respectively of motor coils 110U, 110V, 110W. Bus ring holder 150 is made of an insulating material such as a resin, and is formed as a single component.

Bus ring holder 150 holds ring-shaped bus rings 160U, 160V, 160W for the three phases, respectively. Each of bus rings 160U, 160V, 160W is formed as a single component punched out from a metal sheet and subsequently bent in the circumferential direction. Bus rings 160U, 160V, 160W are arranged sequentially in the radial direction.

Bus ring 160U distributes a U-phase current to motor coils 110U. Bus ring 160V distributes a V-phase current to motor coils 110V. Bus ring 160W distributes a W-phase current to motor coils 110W.

(2) Configurations of Stator and Neutral Bus Ring

Figure 3:
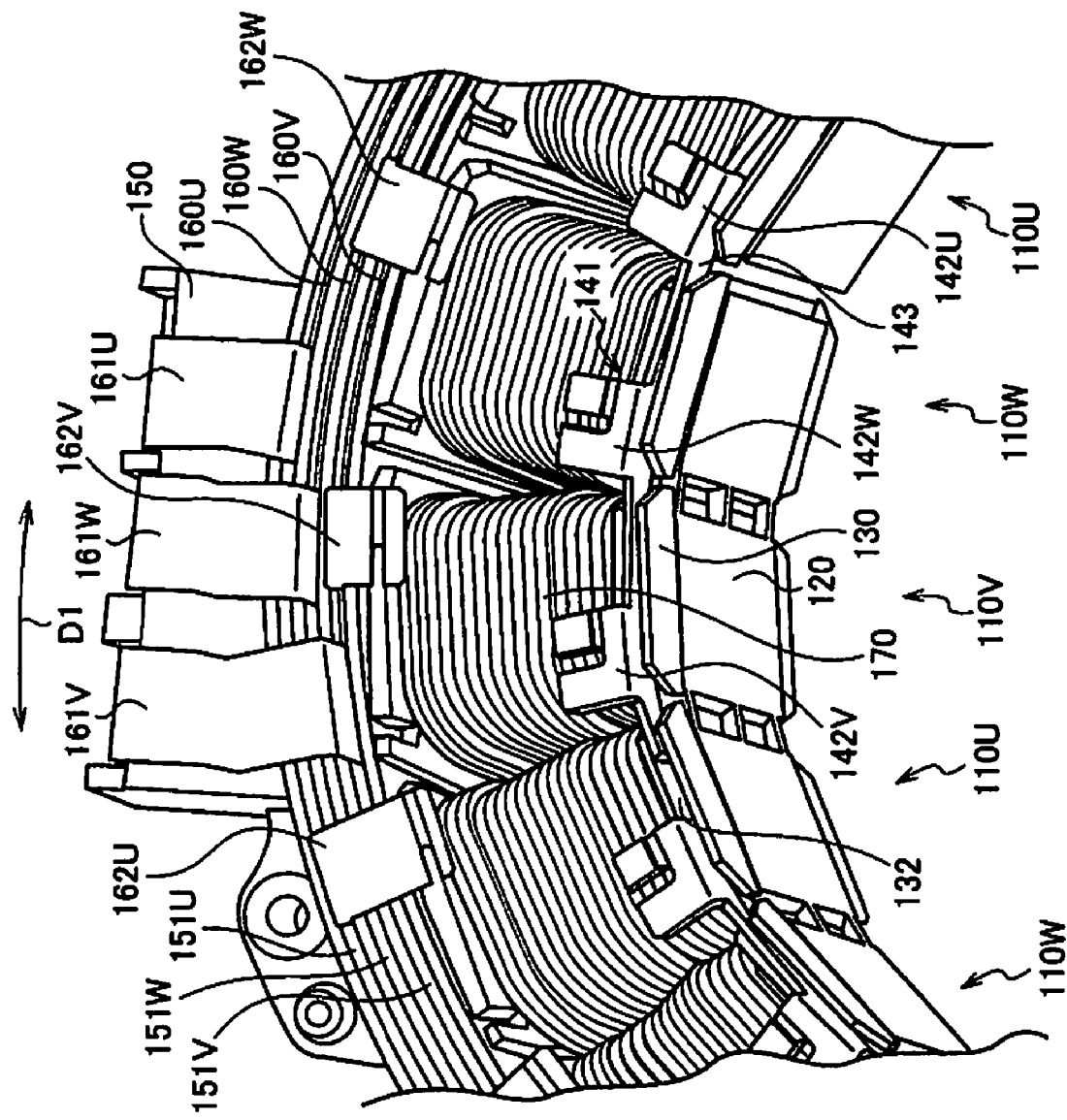
FIG. 3 is a partially-magnified perspective view of the internal configuration of the case main body shown in FIG. 2.

FIG. 3 is a partially-magnified perspective view of the internal configuration of case main body 12 shown in FIG. 2. As shown in FIG. 3, each of motor coils 110U, 110V, 110W includes tooth 120, insulator 130 and wound wire 170.

Tooth 120 is made of a metal, and extends in the radial direction. Tooth 120 is inserted in an insertion hole formed in insulator 130.

Insulator 130 is made of an insulating member. Wound wire 170 is wound around insulator 130.

Neutral bus ring 140 is divided into multiple bus ring members 141. Each bus ring member 141 connects together three motor coils 110U, 110V, 110W which are arranged one after another in the circumferential direction D1.

Each bus ring member 141 is held by corresponding groove parts 132 respectively formed in insulators 130. Specifically, bus ring member 141 includes: inserted part 143 configured to be inserted in corresponding groove parts 132; and three wound-wire connecting terminals 142U, 142V, 142W which extend from inserted part 143 outward in the radial direction.

The thickness direction of inserted part 143 coincides with the radial direction of three-phase brushless motor 10. In addition, inserted part 143 curves in the circumferential direction D1.

Wound-wire connecting terminals 142U, 142V, 142W are provided in bus ring member 141 in such a way as to correspond to motor coils 110U, 110V, 110W, respectively. End portions of wound wires 170 of motor coils 110U, 110V, 110W are soldered to wound-wire connecting terminals 142U, 142V, 142W, respectively.

Bus ring holder 150 is located outside insulator 130 in the radial direction. Multiple holding grooves 151U, 151V, 151W are formed in bus ring holder 150.

Bus ring 160U is inserted in holding groove 151U. Bus ring 160V is inserted in holding groove 151V. Bus ring 160W is inserted in holding groove 151W.

Furthermore, bus ring holder 150 holds current supplying end parts 161U, 161V, 161W configured to supply current to bus rings 160U, 160V, 160W.

Bus ring 160U includes wound-wire connecting terminals 162U which extend inward in the radial direction. Similarly, bus ring 160V includes wound-wire connecting terminals 162V, and bus ring 160W includes wound-wire connecting terminals 162W. The other end portions of wound wires 170 are soldered to corresponding wound-wire connecting terminals 162U, 162V, 162W, respectively.

Figure 4:
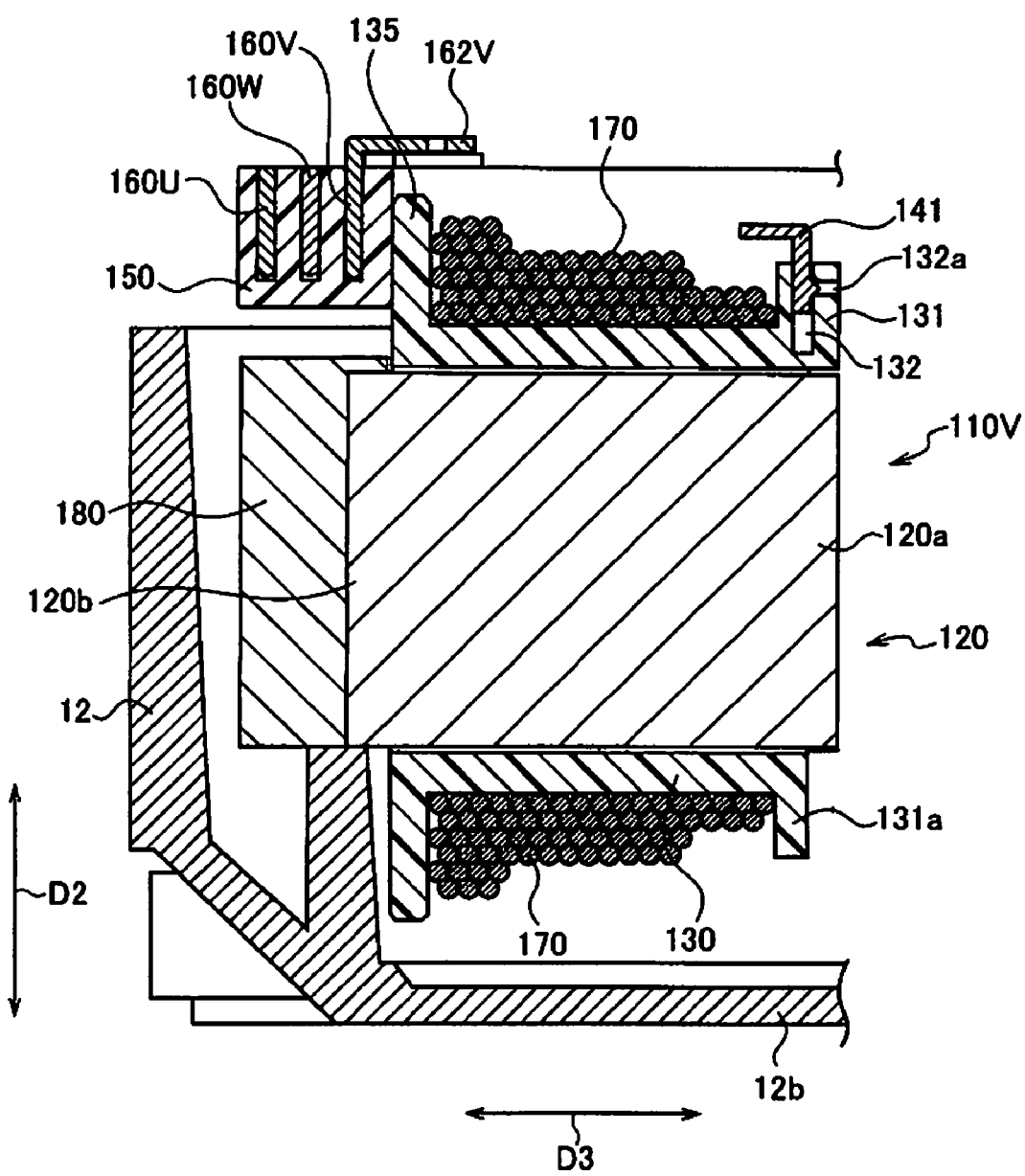
FIG. 4 is a schematic cross-sectional view of the case main body and a stator according to the embodiment.

FIG. 4 is a schematic cross-sectional view of case main body 12 and stator 100. As shown in FIG. 4, inner end part 120a of tooth 120 is exposed to the inside of case main body 12 in the radial direction, and outer end part 120b of tooth 120 is supported by yoke 180. Yoke 180 is fixed to case main body 12.

Each insulator 130 includes: inner flange 131 formed at the inner side of wound wire 170 in the radial direction D3; and outer flange 135 formed at the outer side of wound wire 170 in the radial direction D3. Inner flange 131 and outer flange 135 extend in the axial direction D2.

End part 131a of inner flange 131, which is closer to bottom part 12b of case main body 12, is located at the outer side of inner end part 120a of tooth 120 in the radial direction D3. A step is thereby formed by inner end part 120a of tooth 120 and end part 131a of inner flange 131.

Groove part 132 extending in the axial direction D2 is formed in the opposite side of inner flange 131 from end part 131a. Groove part 132 has opening part 132a which is open to the inside in the radial direction D3. Opening part 132a is formed so as to extend in the radial direction D3.

Bus ring holder 150 is arranged in a side of outer flange 135, which faces outward in the radial direction D3, so as to be contiguous to outer flange 135. Bus ring holder 150 is adjacent to yoke 180 in the axial direction D2.

(3) Detailed Configurations of Neutral Bus Ring and Insulator

Figure 5:
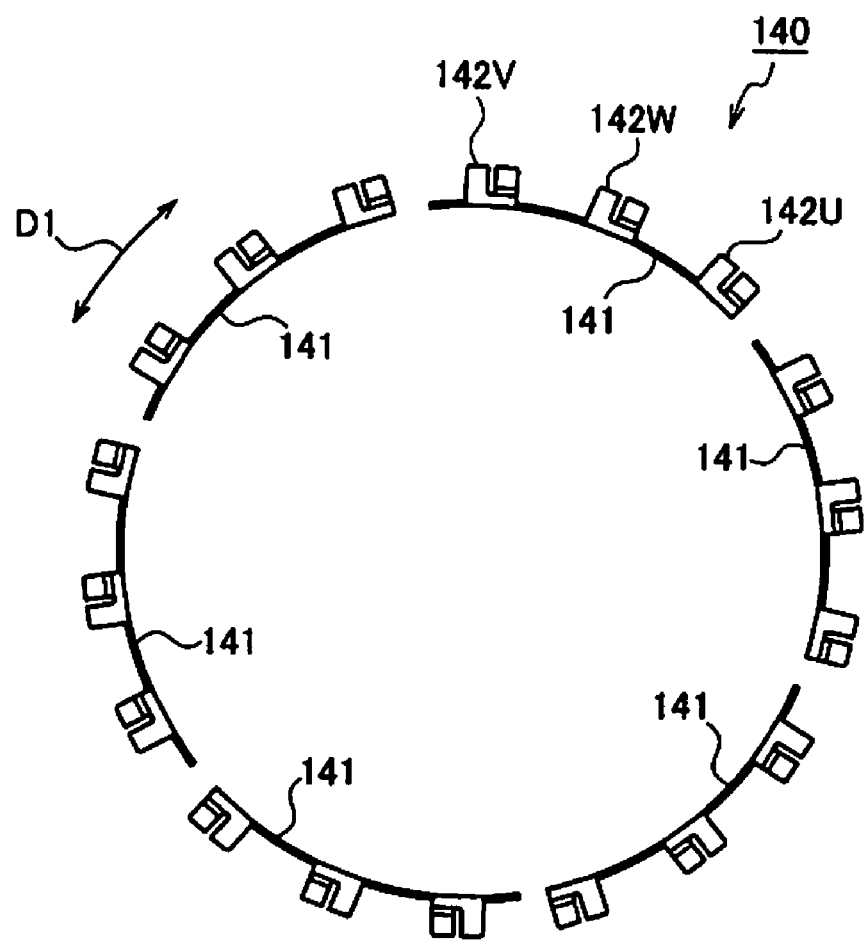
FIG. 5 is a plan view of a neutral bus ring according to the embodiment.

FIG. 5 is a plan view of neutral bus ring 140. As shown in FIG. 5, neutral bus ring 140 includes six bus ring members 141 each having a single form.

Each bus ring member 141 is connected to a set of one motor coil 110U, one motor coil 110V and one motor coil 110W. For this reason, the number of bus ring members 141 included in neutral bus ring 140 is one third of the total number of motor coils 110U, 110V, 110W.

Bus ring member 141 serves as a neutral point among a set of one motor coil 110U, one motor coil 110V, one motor coil 110W. Each bus ring member 141 thereby serves as a reference point among the three U, V and W phases.

Figure 6:
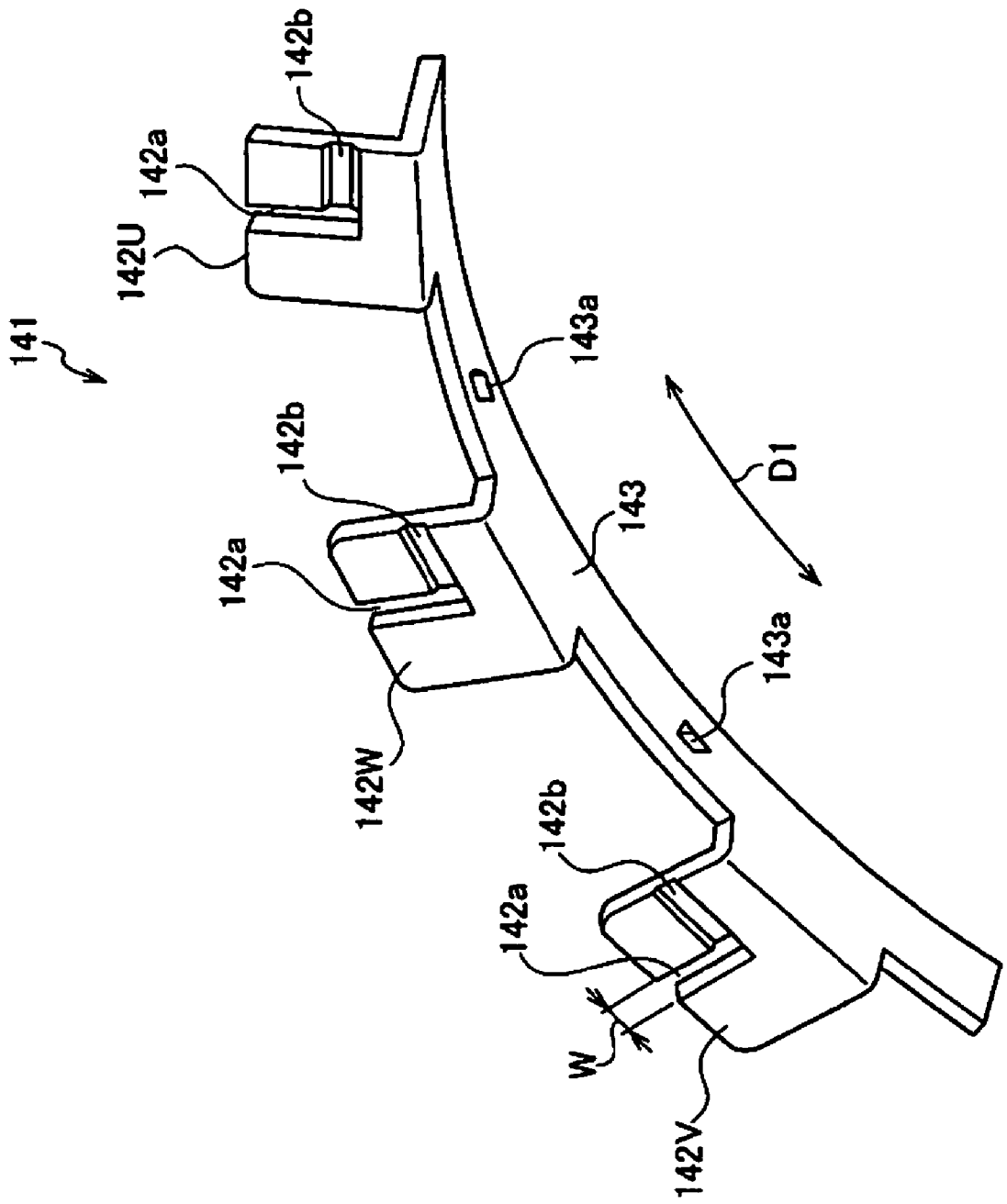
FIG. 6 is a perspective view of a bus ring member according to the embodiment.

FIG. 6 is a perspective view of bus ring member 141. As shown in FIG. 6, inserted part 143 of bus ring member 141 includes cut-and-lifted parts 143a which protrude inward in the radial direction.

Wound-wire connecting terminals 142U, 142V, 142W are connected sequentially so as to be at right angles to inserted part 143. Wound-wire connecting terminals 142U, 142V, 142W have the same form. Specifically, cutout part 142a and concave part 142b are formed in each of wound-wire connecting terminals 142U, 142V 142W.

Cutout part 142a and concave part 142b form a right angle with each other in the plan view shown in FIG. 5. Cutout part 142a is formed in a radial outer end portion of each of wound-wire connecting terminals 142U, 142V, 142W. The width W of cutout part 142a is equal to, or larger than, the diameter of the end portion of corresponding wound wire 170. The end portion of wound wire 170 is thereby held by the cutout part 142a.

Concave part 142b is in contact with one end portion of wound wire 170 which is held by cutout part 142a. Concave part 142b curves in such a way as to meet the external shape of the end portion of wound wire 170. The end portion of wound wire 170 is soldered to concave part 142b with the end portion being in contact with concave part 142b.

Figure 7:
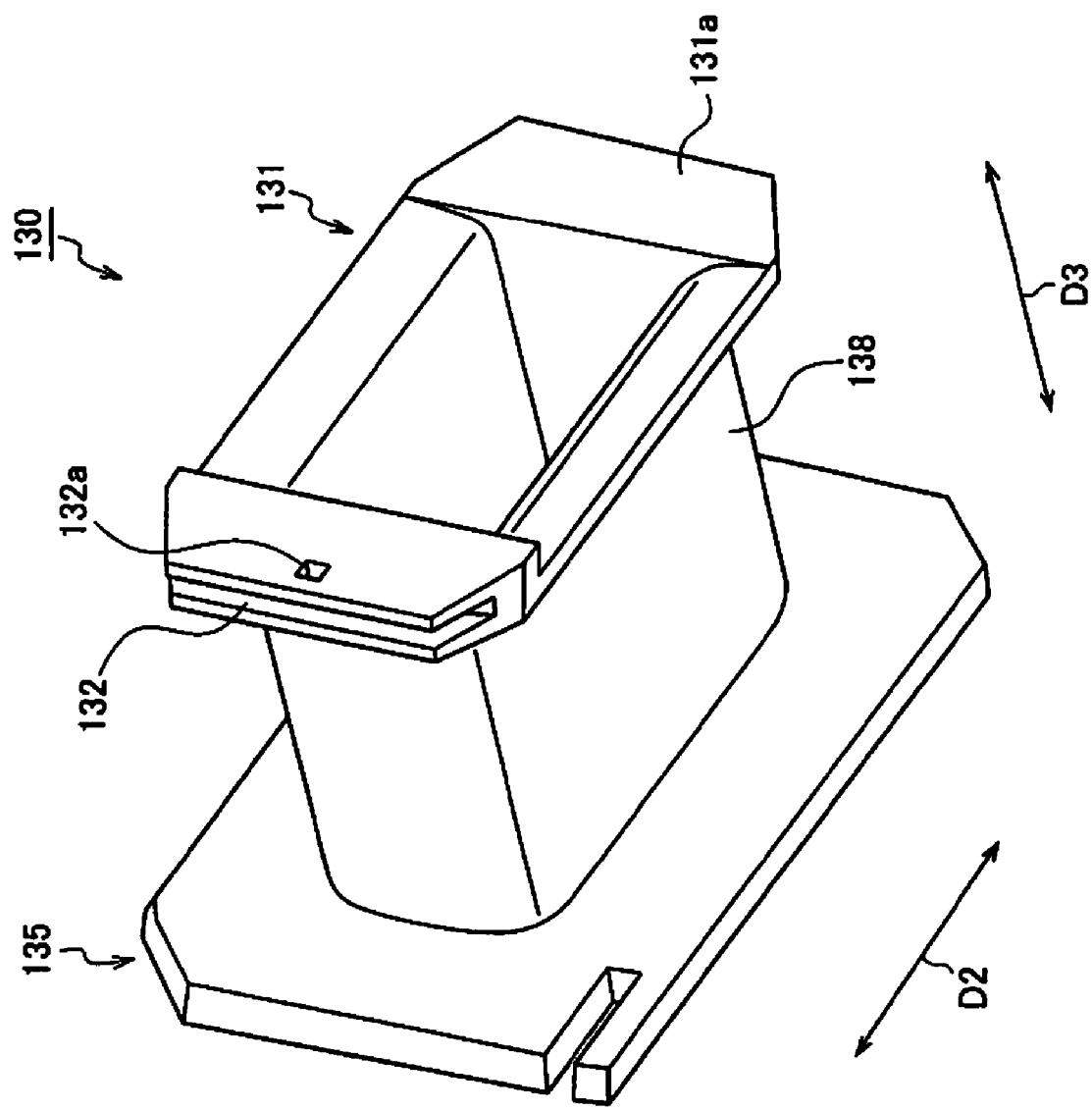
FIG. 7 is a perspective view of an insulator according to the embodiment.

FIG. 7 is a perspective view of insulator 130. As shown in FIG. 7, insulator 130 includes hollowed cylindrical part 138 which connects inner flange 131 and outer flange 135 together.

Each cut-and-lifted part 143a of bus ring member 141 inserted in groove part 132 is fitted into corresponding opening part 132a of inner flange 131. Opening part 132a holds cut-and-lifted part 143a which is fitted into opening part 132a.

(4) Wire Breakage Detecting Method

Figure 8:
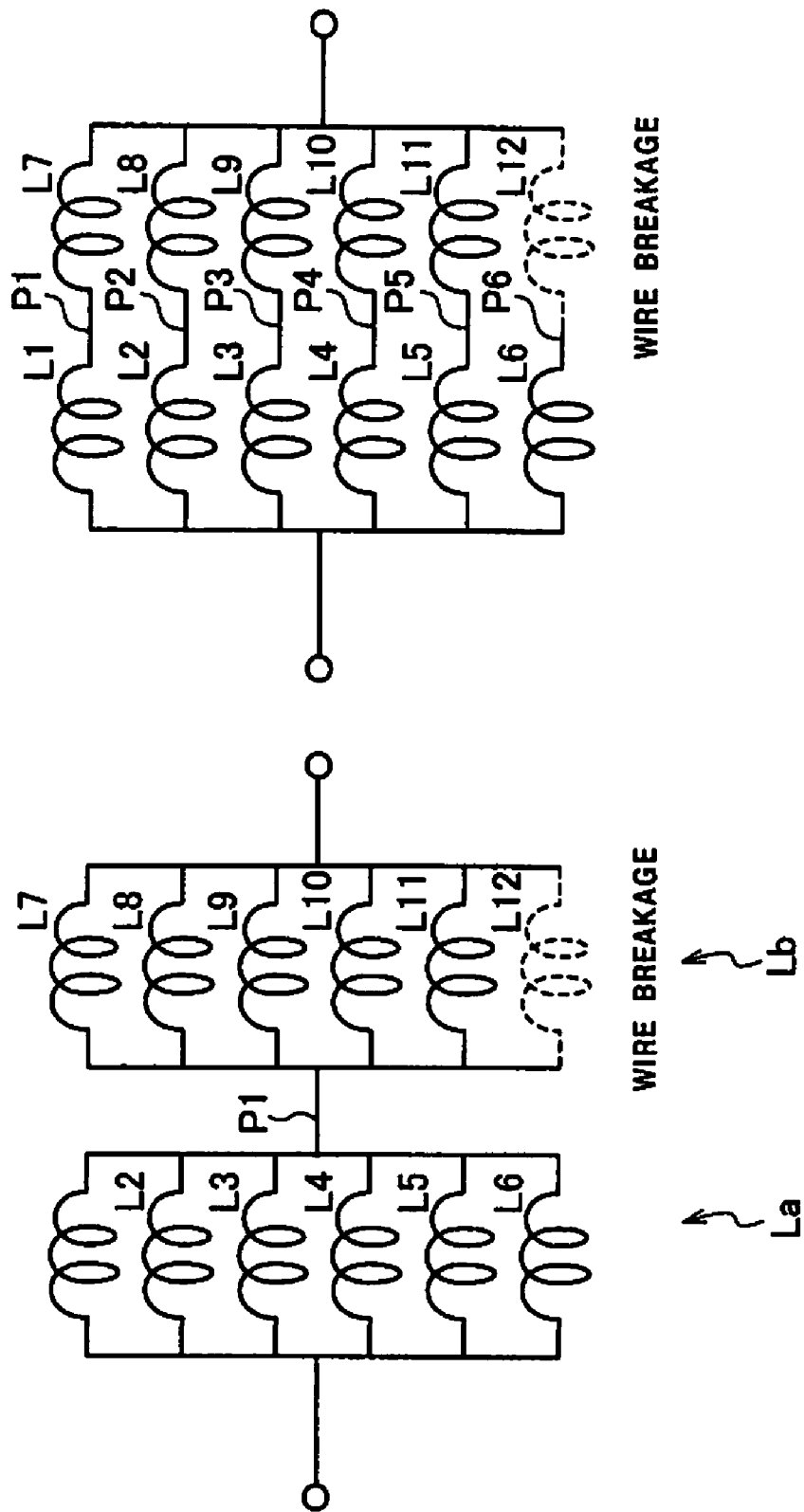
FIGS. 8A and 8B are equivalent circuit diagrams illustrating a wire breakage detecting method which is applied to a three-phase brushless motor according to the embodiment.

FIGS. 8A and 8B are equivalent circuit diagrams illustrating a wire breakage detecting method which is applied to three-phase brushless motor 10. FIG. 8A is an equivalent circuit diagram of an existing three-phase brushless motor. FIG. 8B is an equivalent circuit diagram of three-phase brushless motor 10 according to the embodiment.

Electric current flows simultaneously in two coils out of the U-phase coil, the V-phase coil and the W-phase coil respectively for the three U, V and W phases. For this reason, FIGS. 8A and 8B show circuit diagrams for two phases.

In FIG. 8A, a coil group La consisting of coils connected together in parallel includes six U-phase coils L1 to L6, for instance. In addition, a coil group Lb consisting of coils connected together in parallel includes six V-phase coils L7 to L12, for instance. In the existing three-phase brushless motor, all the motor coils in the motor are connected to a single neutral point P1. Coils L1 to L12 are all, therefore, connected to neutral point P1.

On the other hand, as shown in FIG. 8B that is the equivalent circuit diagram of three-phase brushless motor 10 according to the embodiment, coils L1 to L6 are respectively connected to neutral points P1 to P6 different from each other, and coils L7 to L12 are respectively connected to neutral points P1 to P6 different from each other.

In this respect, while the motor is in a normal condition in which no wire breaks in coils L1 to L12, the inter-phase resistance is expressed with $$1/3 \times r = 10/30 \times r$$

where r denotes resistance of the coil.

In the case shown in FIG. 8A, when a wire breaks in coil L12, the inter-phase resistance is expressed with $$11/30 \times r.$$

On the other hand, in the case shown in FIG. 8B, when a wire breaks in coil L12, the inter-phase resistance is expressed with $$2/5 \times r = 12/30 \times r.$$

When a wire breaks in a coil, as described above, change in a parameter, specifically the inter-phase resistance (or inductance), is larger in three-phase brushless motor 10 according to embodiment than in the existing three-phase brushless motor.

For this reason, if a parameter change is detected from the U-phase, V-phase and V-phase currents and voltages, it can be determined that a wire breaks when the amount of the parameter change exceeds a predetermined amount. This wire breakage detection method may be carried out by a mechanic, or automatically by a wire breakage detecting apparatus to be mounted on the motor vehicle.

(5) Method of How Teeth and Yoke Are Assembled Together

Figure 9:
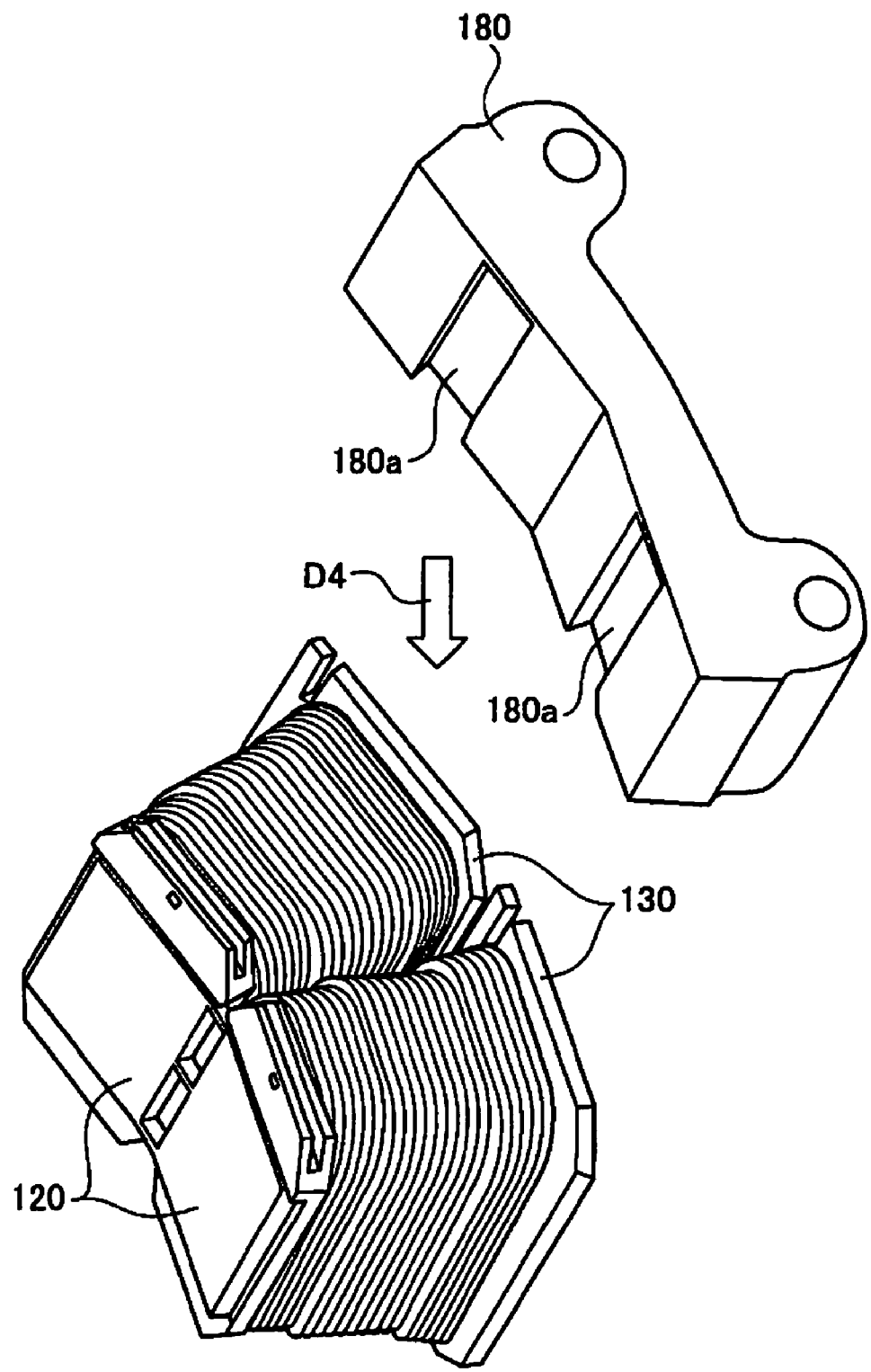
FIG. 9 is a diagram illustrating the method of assembling together teeth and the yoke according to the embodiment (Part 1).
Figure 10:
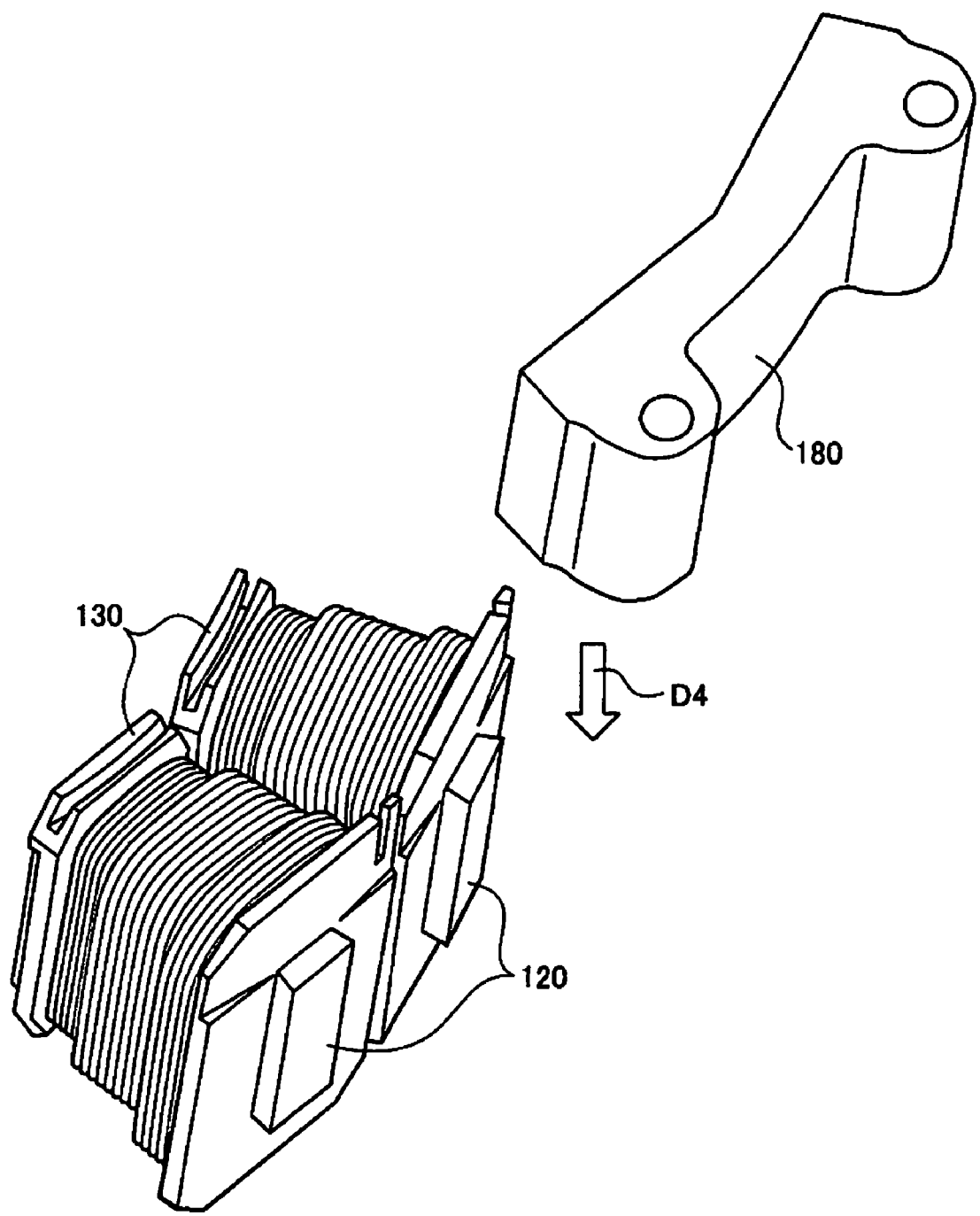
FIG. 10 is another diagram illustrating the method of assembling together teeth and the yoke according to the embodiment (Part 2).
Figure 11:
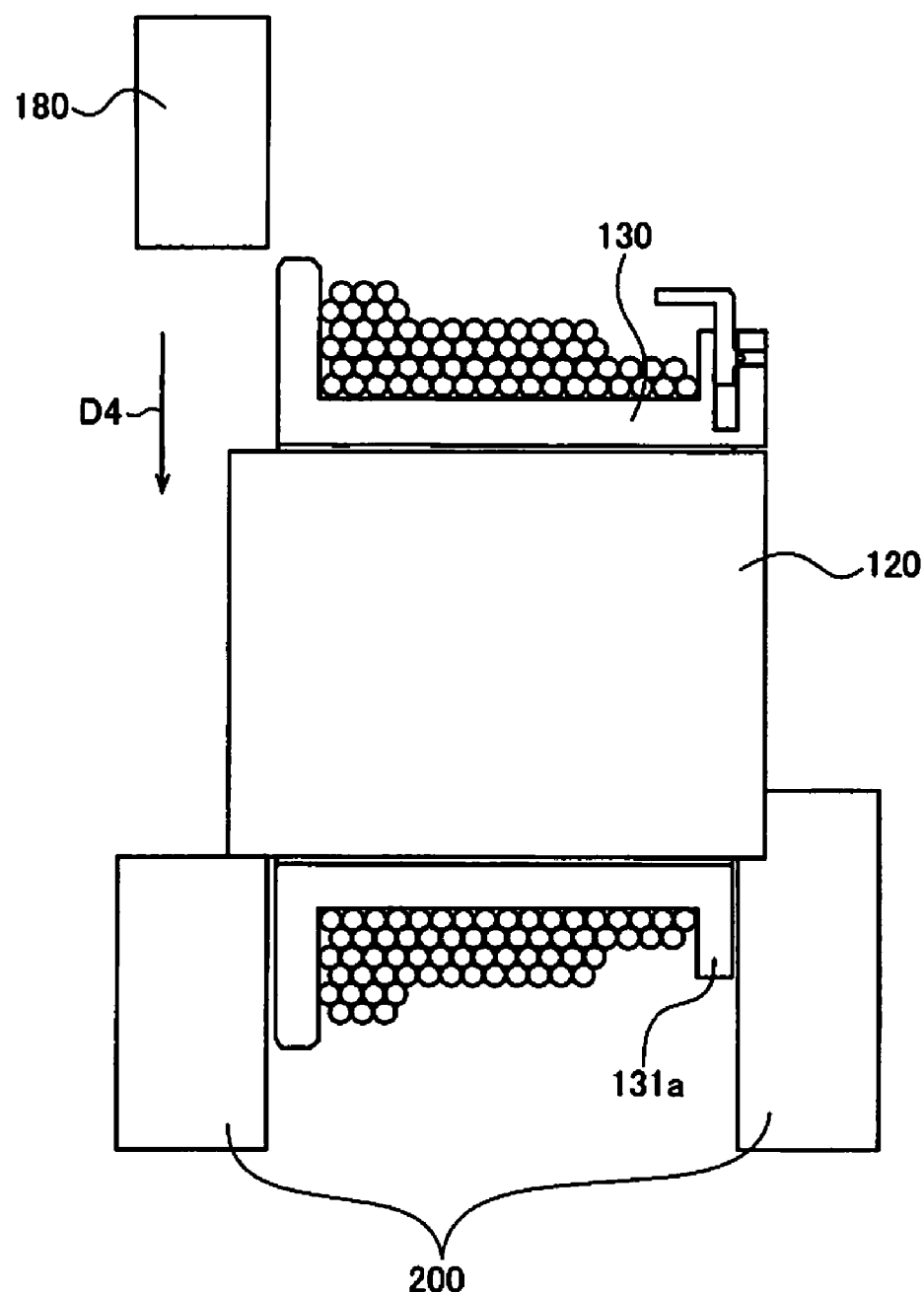
FIG. 11 is yet another diagram illustrating the method of how teeth and the yoke according to the embodiment are assembled together (Part 3).

FIGS. 9 to 11 are diagrams illustrating the method of how teeth 120 and yoke 180 are assembled together. As shown in FIG. 9, yoke 180 is press-fitted to teeth 120 with teeth 120 being respectively inserted in insulators 130. Groove parts 180a are formed in yoke 180.

As shown in FIG. 10, groove parts 180a formed in yoke 180 are press-fitted to end portions of teeth 120, respectively. The cross-section of the end portion of each tooth 120 is shaped like a trapezoid.

As shown in FIG. 11, yoke 180 is fitted to teeth 120 in a press-fitting direction D4 with teeth 120 being fixed to jig 200. At this time, steps are formed by end parts 131a of insulators 130 in the press-fitting direction D4 and end portions of teeth 120, respectively. This makes it possible for jig 200 to fix teeth 120 thereto securely.

(6) Operation and Effects

In three-phase brushless motor 10 of the embodiment, ring-shaped neutral bus ring 140 is divided into the multiple bus ring members 141, and each bus ring member 141 connects together one motor coil 110U, one motor coil 110V and one motor coil 110W included in a corresponding set. Consequently, the number of components in three-phase brushless motor 10 can be significantly reduced compared to the number of components in the three-phase brushless motor having a configuration in which each motor coil is provided with a neutral point connecting member.

In addition, three-phase brushless motor 10 enhances detection of a wire breakage since each bus ring member 141 connects together one motor coil 110U, one motor coil 110V and one motor coil 110W included in a corresponding set so that when a wire breaks, the amount of change in electric characteristics is large enough to be detected.

In the embodiment, each bus ring member 141 connects together a set of one motor coil 110U, one motor coil 110V and one motor coil 110W which are arranged sequentially in the circumferential direction D1. For this reason, each bus ring member 141 can be formed in a smaller size, and accordingly a large metal sheet is not required even in a case where each bus ring member 141 is formed as a single component punched out from the metal sheet.

In the embodiment, a wire breakage in any one of the motor coils 110U, 110V, 110W is detected by a change in resistance or inductance derived from at least one of the electric current and voltage. In other words, a wire breakage can easily be detected without disassembling three-phase brushless motor 10.

In the embodiment, each inner flange 131 includes groove part 132 into which bus ring member 141 is inserted, and bus ring member 141 includes inserted part 143 to be inserted in corresponding groove parts 132. Accordingly, bus ring member 141 can easily be attached to corresponding inner flanges 131. Furthermore, in each bus ring member 141, wound-wire connecting terminals 142U, 142V, 142W to which end portions of wound wires 170 are connected extend from inserted part 143 outward in the radial direction. This makes it possible to locate wound-wire connecting terminals 142U, 142V, 142W closer to wound wires 170, respectively. Consequently, wound wires 170 can be connected to wound-wire connecting terminals 142U, 142V, 142W without extending wound wires 170, respectively.

In the embodiment, inserted part 143 includes cut-and-lifted parts 143a which protrude in the radial direction. Opening parts 132a configured to hold cut-and-lifted parts 143 are formed in corresponding groove parts 132, thereby allowing bus ring member 141 to be positioned, so that bus ring member 141 is prohibited from moving in the circumferential direction, and from coming off from groove parts 132. In addition, since being made of metal, cut-and-lifted parts 143a can maintain their strength even though being small in size.

In the embodiment, cutout parts 142a for holding the end portions of wound wires 170 therein are formed in wound-wire connecting terminals 142U, 142V, 142W, respectively. Cutout parts 142a stabilizes wound wires 170 thereby making it easier to connect wound wires 170 to wound-wire connecting terminals 142U, 142V, 142W. In addition, this also achieves an increase in the strength of connection between each wound wire 170 and a corresponding one of wound-wire connecting terminal 142U, 142V, 142W. Dividing neutral bus ring 140 into multiple bus ring members 141 might raise a concern that bus ring members 141 could easily shift during the soldering of wound wires 170 to wound-wire connecting terminals 142U, 142V, 142W. However, bus ring members 141 are actually less likely to shift due to cutout parts 142a holding the end portions of wound wires 170.

In the embodiment, the end portions of wound wires 170 are soldered to the surfaces of plate-shaped wound-wire connecting terminals 142U, 142V, 142W, respectively. Furthermore, the surfaces of wound-wire connecting terminals 142U, 142V, 142W contacting the end portions of wound wires 170 are each formed in a concave shape. Thereby allowing wound wires 170 to be soldered respectively to wound-wire connecting terminals 142U, 142V, 142W with their contact areas being increased. Accordingly, the embodiment further increases the strength of connection between each wound wire 170 and a corresponding one of wound-wire connecting terminals 142U, 142V, 142W. Moreover, the wound wires 170 are soldered to wound-wire connecting terminals 142U, 142V, 142W, being positioned by use of cutout parts 142a and concave parts 142b, respectively. Accordingly, the embodiment improves connection operation of wound wires 170 to wound-wire connecting terminals 142U, 142V, 142W.

In the embodiment, end part 131a of each inner flange 131 is located at an outer side of internal end part 120a of corresponding tooth 120 in the radial direction. Thereby, a step is formed by end part 131a and inner end part 120a of corresponding tooth 120. Accordingly, teeth 120 can be securely fixed to jig 200.

(7) Other Embodiments

The foregoing descriptions of the invention are provided on the basis of the embodiment. However, the descriptions and drawings constituting part of this disclosure shall not be construed as limiting this invention. From this disclosure, various alternative embodiments, examples and operational techniques are clear to those skilled in the art.

The above embodiment has been described by citing the configuration in which sets of one motor coil 110U, one motor coil 110V and one motor coil 110W are arranged sequentially in the circumferential direction D1, and are connected together by use of a corresponding one of the multiple bus ring members 141. However, another embodiment may be applicable in which one motor coil 110U, one motor coil 110V and one motor coil 110W are included in a single set and connected together, but are arranged separated from each other in the circumferential direction D1.

Specifically, in this embodiment three-phase brushless motor 10 includes: first U-phase coil (motor coil 110U) and second U-phase coil (motor coil 110U); first V-phase coil (motor coil 110V) and second V-phase coil (motor coil 110V); as well as first W-phase coil (motor coil 110W) and second W-phase coil (motor coil 110W).

A U-phase current is supplied to one end of first U-phase coil (motor coil 110U) and one end of second U-phase coil (motor coil 110U). A V-phase current is supplied to one end of first V-phase coil (motor coil 110V) and one end of second V-phase coil (motor coil 110V). A W-phase current is supplied to one end of first W-phase coil (motor coil 110W) and one end of second W-phase coil (motor coil 110W).

In addition, the other end of first U-phase coil (motor coil 110U), the other end of first V-phase coil (motor coil 110V) and the other end of first W-phase coil (motor coil 110W) are connected to a first neutral point. The other end of second U-phase coil (motor coil 110U), the other end of second V-phase coil (motor coil 119V) and the other end of second W-phase coil (motor coil 110W) are connected to a second neutral point. In this respect, the first neutral point and the second neutral point are electrically insulated from each other.

In the above-described embodiment, one end portion of wound wires 170 are soldered to wound-wire connecting terminals 142U, 142V, 142W, respectively. In addition, the other end portion of wound wires 170 are soldered to wound-wire connecting terminals 162U, 162V, 162W, respectively. However, soldering may be replaced with welding.

In the foregoing embodiment, three-phase brushless motor 10 includes the total of 18 motor coils 110U, 110V, 110W. However, three-phase brushless motor 10 may include more motor coils 110U, 110V, 110W. Furthermore, in the foregoing embodiment, three-phase brushless motor 10 includes the 18 motor coils 110U, 110V, 110W, or the six sets each consisting of one U-phase motor coil, one V-phase motor coil and one W-phase motor coil. However, three-phase brushless motor 10 may be configured by including at least two sets.

In the foregoing descriptions, three-phase brushless motor 10 is described to be mounted on a motor vehicle. However, three-phase brushless motor 10 may be mounted not only on a motor vehicle, but also on an electric appliance.

As described above, the motor according to the embodiment makes it possible to reduce the number of parts needed for the neutral point connecting structure, and concurrently enhances detection of a wire breakage in any one of the motor coils.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A motor comprising:
   a stator including a plurality of motor coils, the motor coils comprising a plurality of U-phase coils, a plurality of V-phase coils and a plurality of W-phase coils, which are arranged in a circumferential direction of the motor; and
   a neutral bus ring configured to connect the motor coils, the neutral bus ring is divided into a plurality of bus ring members, and each bus ring member connects together any one of the U-phase coils, any one of the V-phase coils, and any one of the W-phase coils; and
   a detecting unit configured to detect a wire breakage in one of the motor coils according to an amount of change in any one of resistance and inductance of the motor coil, the amount of change being derived from at least one of a change of current and/or a change of voltage in one of the motor coils when currents and voltages of a plurality of phases are distributed to the motor coils.

2. The motor of claim 1, wherein
   the motor coils include a plurality of sets, each set including one U-phase coil, one V-phase coil and one W-phase coil that are arranged sequentially in the circumferential direction of the motor, and
   each of the bus ring members connects together one U-phase coil, one V-phase coil and one W-phase coil in a corresponding one of the sets.

3. A method, comprising:
   applying power to a motor of claim 1;
   distributing currents and voltages of a plurality of phases to the motor coils, and
   operating the detection unit to detect for possible wire breakages.

4. A motor comprising:
   a stator including a plurality of motor coils, the motor coils comprising a plurality of U-phase coils, a plurality of V-phase coils and a plurality of W-phase coils, which are arranged in a circumferential direction of the motor; and
   a neutral bus ring configured to connect the motor coils, the neutral bus ring is divided into a plurality of bus ring members, and each bus ring member connects together any one of the U-phase coils, any one of the V-phase coils, and any one of the W-phase coils, wherein
   each of the motor coils includes an insulator around which a wound wire is wound,
   the insulator includes an inner flange that is provided at an inner side of the wound wire in a radial direction of the motor,
   the inner flange includes a groove part into which a corresponding one of the bus ring members is inserted, and
   each of the bus ring members comprises:
   an inserted part that is inserted in a corresponding one of the groove parts; and
   wound-wire connecting terminals which extend outward from the inserted part in the radial direction of the motor and are connected to end portions of corresponding ones of the wound wires, respectively.

5. The motor of claim 4, wherein
   the inserted part includes cut-and-lifted parts which protrude in the radial direction of the motor, and
   the groove part includes an opening part configured to hold a corresponding one of the cut-and-lifted parts.

6. The motor of claim 4, wherein
   each of the wound-wire connecting terminals includes a cutout part, and
   the cutout part holds the end portion of a corresponding one of the wound wires.

7. The motor of claim 4, wherein
   each of the wound-wire connecting terminals is shaped like a plate,
   the end portions of the wound wires are connected to surfaces of the corresponding wound-wire connecting terminals, respectively, and
   the wound-wire connecting terminal includes a concave part on its surface in a portion where the surface is in contact with the end portion of the wound wire.

8. The motor of claim 4, further comprising:
   a tooth extending in the radial direction of the motor and being inserted in the insulator; and
   a yoke arranged outside the insulators in the radial direction of the motor, and being press-fitted to an end portion of the tooth,
   wherein an end portion of the inner flange in a direction in which the yoke is press-fitted to the tooth is located at an outer side of the other end portion of the tooth in the radial direction of the motor.

9. A method, comprising:
   applying power to a motor comprising:
   a motor coil comprising:
   a first U-phase coil and a second U-phase coil;
   a first V-phase coil and a second V-phase coil; and
   a first W-phase coil and a second W-phase coil,
   wherein
   a U-phase current is supplied to an end of the first U-phase coil and to an end of the second U-phase coil,
   a V-phase current is supplied to an end of the first V-phase coil and to an end of the second V-phase coil, a W-phase current is supplied to an end of the first W-phase coil and to an end of the second W-phase coil, the other end of the first U-phase coil, the other end of the first V-phase coil, and the other end of the first W-phase coil are connected to a first neutral point, the other end of the second U-phase coil, the other end of the second V-phase coil, and the other end of the second W-phase coil are connected to a second neutral point, and the first neutral point and the second neutral point are electrically insulated from each other, and detecting a wire breakage in one of the motor coils.

10. The method of claim 9, wherein detecting a wire breakage in one of the motor coils includes detecting a change in inter-phase inductance.

11. A motor comprising:

a motor coil comprising:

a first U-phase coil and a second U-phase coil;

a first V-phase coil and a second V-phase coil; and a first W-phase coil and a second W-phase coil, wherein a U-phase current is supplied to an end of the first U-phase coil and to an end of the second U-phase coil, a V-phase current is supplied to an end of the first V-phase coil and to an end of the second V-phase coil, a W-phase current is supplied to an end of the first W-phase coil and to an end of the second W-phase coil, the other end of the first U-phase coil, the other end of the first V-phase coil, and the other end of the first W-phase coil are connected to a first neutral point, the other end of the second U-phase coil, the other end of the second V-phase coil, and the other end of the second W-phase coil are connected to a second neutral point, the first neutral point and the second neutral point are electrically insulated from each other, and wire breakage detection circuitry.

12. The motor of claim 11, wherein the wire breakage detection circuitry detects a change in inter-phase inductance.

* * * * *